United States Patent [19]

Vilk et al.

[11] Patent Number: 4,494,974

[45] Date of Patent: Jan. 22, 1985

[54] FOREHEARTH FOR CONDITIONING GLASS

[75] Inventors: Peter Vilk, London; Alan Stephens, Greenford, both of England

[73] Assignee: B.H.F. (Engineering) Ltd., Middlesex, England

[21] Appl. No.: 510,449

[22] PCT Filed: Oct. 19, 1982

[86] PCT No.: PCT/GB82/00295
§ 371 Date: Jun. 16, 1983
§ 102(e) Date: Jun. 16, 1983

[87] PCT Pub. No.: WO83/01440
PCT Pub. Date: Apr. 28, 1983

[30] Foreign Application Priority Data

Oct. 19, 1981 [GB] United Kingdom ........... 8131468

[51] Int. Cl.³ ............................................. C03B 5/23
[52] U.S. Cl. ............................... 65/337; 65/346; 65/347; 65/356
[58] Field of Search ................. 65/337, 347, 346, 356

[56] References Cited

U.S. PATENT DOCUMENTS

| | | | |
|---|---|---|---|
| 1,893,060 | 1/1933 | Peiler | 65/337 X |
| 2,089,690 | 8/1937 | Cornelius | 65/337 X |
| 2,144,973 | 1/1939 | Honiss | |
| 2,649,903 | 8/1953 | Russell | 65/346 X |
| 3,198,619 | 8/1965 | Nuzum | |
| 3,201,219 | 8/1965 | Frazier et al. | 65/347 |
| 3,248,203 | 4/1966 | Cunningham | 65/346 X |
| 3,582,310 | 6/1971 | Avery et al. | |
| 3,645,712 | 2/1972 | Ihrig et al. | 65/347 X |
| 3,676,099 | 7/1972 | Fultz | 65/337 X |
| 3,999,972 | 12/1976 | Brax | |

FOREIGN PATENT DOCUMENTS

| | | |
|---|---|---|
| 2022539 | 11/1969 | France |
| 1019102 | 2/1966 | United Kingdom |
| 1023014 | 3/1966 | United Kingdom |
| 1543166 | 3/1979 | United Kingdom |

*Primary Examiner*—Robert Lindsay
*Attorney, Agent, or Firm*—Cushman, Darby & Cushman

[57] ABSTRACT

Forehearths for use in glass production comprise a refractory trough (52) for molten glass with an insulating roof thereover, means for heating glass in the trough and means for blowing cooling air across the inside of the roof surface; the forehearth being constructed of at least two sections (A, B and C) which have different insulating characteristics from each other. Preferably the forehearth roof is made up of prefabricated block members of refractory material lying side by side and each of which member spans across the trough. Different insulation is provided over the prefabricated block members to provide different insulating characteristics within sections of the forehearth. The invention also provides prefabricated members for use in the construction of the forehearth according to the present invention.

6 Claims, 6 Drawing Figures

FOREHEARTH FOR CONDITIONING GLASS

This invention relates to forehearths for use in glass production.

In glass production, molten glass is produced in a melting furnace and then passes along a forehearth before being led away for further processing. For example in the production of glass articles the molten glass from the forehearth may pass to a spout where it is formed into gobs which are subsequently formed into the desired articles. Generally in any particular installation there are several forehearths each with a spout fed by a single melting furnace.

Conventional forehearths comprise a refractory trough along which the molten glass flows and which is provided with an insulating roof and heaters (e.g. gas burners) are arranged along the side of the trough within the forehearth. In addition cooling air may be blown into the forehearth transversely or longitudinally of the direction of glass flow.

The roofs of such forehearth are generally made up of individually ground fire-bricks to provide air passages therethrough, the fire-bricks being overlain with insulating bricks. Thus the forehearths are very time consuming to construct and tend to require substantial steelwork as superstructure.

The viscosity of molten glass is highly temperature dependant. Molten glass usually leaves any particular melting furnace at a fixed temperature. However the desired temperature of the glass as it leaves the forehearth for further processing varies for example depending on the type of glass being used, e.g. whether it is white or coloured glass, and the required working viscosity. In addition in order to achieve uniformity in the eventual product glass, the viscosity of the molten glass from the forehearth should be homogeneous throughout.

The temperature, and thus also the viscosity, of the molten glass is controlled as the molten glass flows along the forehearth. Temperature control within conventional forehearths has been achieved by means of heat exchange radiation between the molten glass and the cooled roof surface and heat losses through the forehearth structure and heat supplied to the installation from the heaters. In fact in order to obtain acceptable temperature control in this way quite substantial quantities of heat input are required and thus, in these days of increasing energy costs, running costs are undesirably high.

It is known that as the molten glass moves down the forehearth there tends to be a greater temperature loss at the sides of the molten glass stream than in the centre and also that the glass next to the trough walls tends to move more slowly than that in the centre of the stream. This of course leads to inhomogeneity across the glass stream with the glass next to the side walls being of greatest viscosity. The provision of heaters in the conventional forehearths of course compensates to some extent for this heat loss. However, in addition to being costly, this is not entirely satisfactory as regards the amount of control of the installation which it allows.

All previous forehearths have been of uniform construction along their entire length, the length itself depending upon the amount of cooling required and also of course on the amount of space available.

According to the present invention there is provided a forehearth for use in glass production which forehearth comprises a refractory trough for molten glass with an insulating roof thereover, and means for heating glass in the trough and means for blowing cooling air across the inside roof surface; the forehearth being constructed of at least two sections which have different insulating characteristics from each other. In the two forehearth sections either the trough or the roof (or both) of the different sections may have the different insulating characteristics.

By choosing sections having the appropriate insulating characteristics, the forehearth according to the present invention can be constructed such as to provide optimum working conditions for any particular installation alongs its entire length. These optimum working conditions will vary from installation to installation. The use of sections of different insulation characteristics along the length of the forehearth enables very much better control to be had over the temperature within the forehearth than in the previous forehearths which were of uniform construction along their whole length.

Governing factors in determining working conditions are the temperature of the molten glass in the section and the required temperature of the glass as it leaves the forehearth, which in turn depends upon the kind of glass used and how it is to be further processed. There is usually a net cooling as the molten glass travels along the forehearth but in some circumstances it may be necessary for heat to be put into the system during travel along the forehearth. The construction of any particular forehearth will amongst other things depend upon the site where it is to be installed. Thus there may be a limitation as regards length due to the space available and if the forehearth is in a draughty position then the rate of heat loss may be increased. Another important factor is of course cost and it may be that a compromise has to be reached between the desired final working temperature of the molten glass, the space available on site for the forehearth and cost factors. For example highly insulating forehearth sections tend to be more expensive than less highly insulating sections but of course in turn with the more highly insulating sections there may well be a gain as regards energy cost savings.

Thus, where in the forehearth according to the present invention, it is desired to minimise heat loss (or to have a heat gain) the forehearth section may be clad over the base and side walls with an outer layer of very highly insulating material. In this way the heat loss from the atmosphere is kept to a minimum and the amount and cost of energy required for a heat gain is kept as low as possible.

Alternatively it may be appropriate to provide a forehearth section with highly insulating material along only the side walls of the refractory trough to reduce the loss of heat from the molten glass along its sides to improve homogeneity and decrease the amount of heat which requires to be added to the section.

There are some glasses, especially coloured glasses, where high bottom energy temperatures are a problem. In such cases it is highly desirable that heat should be removed from the bottom part of the molten glass stream in order to make this more temperature homogeneous with respect to the stream. This may be according to the present invention by providing a forehearth section with a heat sink of fire-bricks below the refrctory trough in order to draw away heat. In addition it may be desirable to provide under the trough a channel down which cooling air in the case of high bottom energy temperatures may be blown.

For ease of construction of the sections of the present forehearth, the forehearth roofs are preferably made up of prefabricated block members lying side by side and each of which members spans across the trough. Roofs of forehearths according to the present invention using such prefabricated block members may be of very simple construction. Indeed, for any particular installation a minimum number of kinds of prefabricated block members may be required. Different insulation may be provided over these prefabricated block members to provide different insulating characteristics within sections as required according to the present invention. The present invention also provides prefabricated members for use in construction of the forehearth according to the present invention. The prefabricated members may be of any suitable refractory materials. They may be of conventional refractory material but this material is generally non-insulating. Preferably the members are made of bubble alumina, which is a foam product which is both refractory and insulating.

In the forehearth according to the present invention any suitable mode of heating may be used. In particular there may be mentioned gas heating, radiant electric heating and submerged electrode heating in accordance with conventional forehearth constructions.

The means for blowing cooling air across the inside forehearth roof surface to cool the glass surface by heat exchange radiation can be adapted to blow the air transversely or longitudinally with respect to the direction of glass flow within the the forehearth. Thus the forehearth roof may be provided with air passageways for discharging air transversely on to the inner roof surface or can be provided with an air inlet connected to a channel extending longitudinally along the roof to provide a longitudinal air flow.

In the following there are described forehearth sections of differing insulating characteristics which can be used according to the present invention.

For the conditioning section of a forehearth according to the present invention or elsewhere in the forehearth where it is required that there should be a net heat gain (or only a small heat loss) from the molten glass, the forehearth section needs to be well insulated. This is suitably achieved by providing the side walls and base of the refractory trough with one or more outer layers of very highly insulating material e.g. Microtherm which is a highly insulating titanium oxide waste material in addition to the conventional insulating brick layers. In this way heat losses through the trough walls are kept to an absolute minimum. In addition the forehearth roof should be also provided with an outer layer of highly insulating material e.g. ceramic fibre material of aluminium silicate. This insulating material is not as highly insulating as the Microtherm material of the trough outer layers but is less expensive and generally adequate for the purpose. Of course if desired materials with different insulating characteristics could also be provided. Additionally heat may be introduced by means of the heaters, e.g. gas burners, mounted in conventional manner below the roof. This section of the forehearth need not be provided with means for blowing cooling air across the inside roof surface since the molten glass in the trough is not force cooled. However, as in conventional forehearth roofs, at least one duct for the venting of exhaust burner gases is provided. The gas flow is controlled by means of a damper over the duct exit in conventional manner. Because of the very high insulation of this section the loss of heat from the molten glass to the atmosphere is minimized and accordingly the amount (and cost) of heat which has to be introduced are kept to a minimum.

One of the main causes of inhomogeneity in the molten glass is by heat loss through the side walls of the trough leaving to a temperature gradient across the molten glass. In the past this has been compensated for by supplying additional heat to the system by means of heaters located along the sides of the forehearth trough. In the present invention the forehearth may comprise, where it is desired to keep these side wall losses to a minimum, a section where in just the side walls of the refractory trough the conventional insulating bricks are provided with an outer layer of highly insulating material e.g. Mircotherm. This means that heat losses are reduced compared with conventional structures and accordingly that the heat which needs to be introduced into the system is reduced. This form of section is suitable for the conditioning of the molten glass where heat losses, but low heat losses, are acceptable and thus, being cheaper than the highly insulated section discussed above, provides a low cost alternative for the conditioning section of the forehearth. In this case again there will be no forced cooling of the molten glass although again it will be necessary to provide one or more ducts in the section for the venting of exhaust gases. Alternatively a section having this construction may be used in the cooling zone of the forehearth in which case it will be provided with means for the passage of cooling air.

In sections of the forehearth where a greater cooling rate is desired, then the outer highly insulating layer may be omitted. Such a construction of section is generally suitable only for use in the cooling zone of the forehearth. Thus the forehearth roof will generally also be provided with means for the introduction of a cooling air stream.

Another form of forehearth section suitable for inclusion in the forehearth according to the present invention in installations where high bottom entry temperatures are a problem comprises means in the base of the forehearth for increasing the rate of loss of heat from the base of the glass stream. Thus the base of the forehearth trough may comprise fire-bricks which form a heat sink to extract heat from the glass stream and may in addition be provided with a channel for cooling air running under the heat sink for removal of the heat. Again this construction is generally only suitable for use in the cooling zone of the forehearth and thus the roof of this forehearth section will generally be provided with means for the introduction of a cooling air stream.

Which sections are to be used in any particular forehearth are chosen according to the job for which that forehearth is to be used and its proposed site. By appropriate choice it is possible to have very accurate control on the temperature and viscosity of the molten glass within the forehearth while keeping the requirements as regards heat input into the installation to a minimum.

The invention is further illustrated by way of example in the accompanying drawings wherein.

Figure 1:
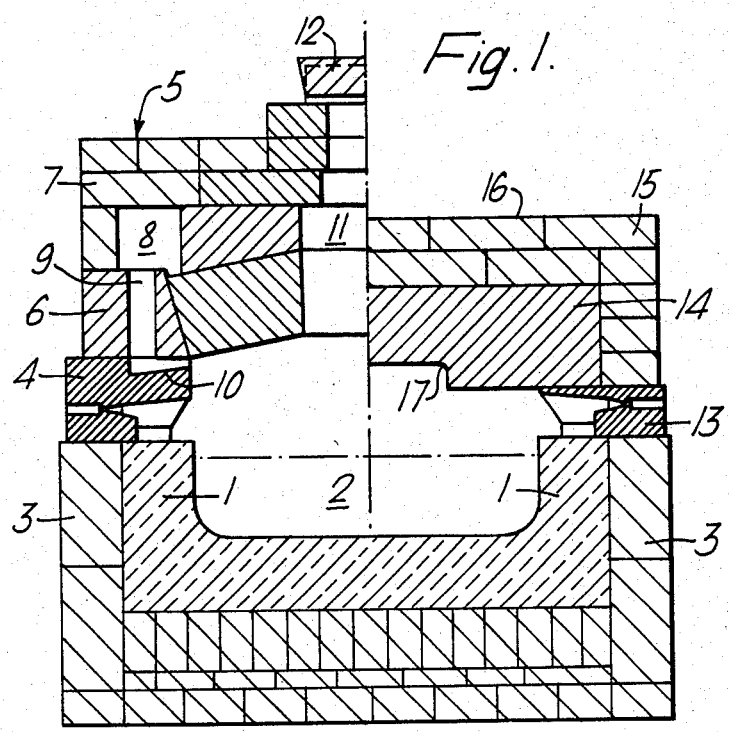
FIG. 1 shows in cross-section part of a forehearth section of conventional construction and part employing a prefabricated block member according to a preferred embodiment of the present invention.

Referring to FIG. 1 of the accompanying drawings, there is shown on the left-hand side, a forehearth section which is of conventional construction. Thus the forehearth comprises a refractory trough 1 for the molten glass 2. The refractory trough 1 is surrounded by a layer of insulating bricks 3. Along the side of the trough are arranged burner blocks 4 to enable heat to be supplied. The roof 5 of the forehearth comprises individually ground fire-bricks 6 each of a special shape and overlain with insulating bricks 7. The fire-bricks are shaped and the fire-bricks and insulating bricks are arranged such as to provide an air passage 8 through the forehearth roof which via a conduit 9 which cooperates with a conduit 10 in the burner block 4 to discharge a transverse air stream across the underside of the roof. In addition the arrangements of bricks is such as to provide a central duct 11 for the venting of exhaust gases from the burners and for the cooling gases. The air flow is controlled by means of a conventional damper 12 across this duct 11.

On the right-hand side of FIG. 1 there is shown a forehearth section wherein the trough portion is the same as that of the left-hand portion. Thus the refractory trough 1 containing molten glass 2 is surrounded by insulating bricks 3. Along the edge of this trough there are provided burner blocks 13. A prefabricated bubble alumina block member 14 spans across the trough and supports insulating bricks 15 in a double layer to provide the forehearth roof 16. This bubble alumina member has a central channel 17 for conducting a longitudinal cooling air stream across the inside surface of block 14. The insulating characteristics of this right-hand section will be referred to hereinafter as "Grade C Insulation".

In the drawings like parts are given like reference numerals.

Figure 2:
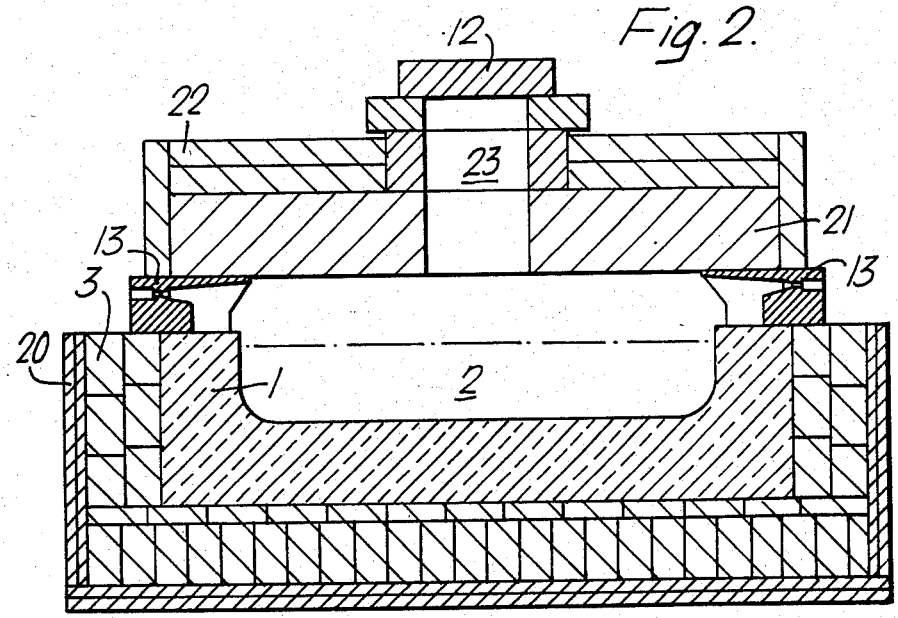
FIG. 2 is a cross section through a conditioning section of the forehearth according to the present invention.

In FIG. 2 of the drawings there is shown a forehearth section which is highly insulating suitable for use in the conditioning zone of a forehearth. Here the forehearth comprises a refractory trough 1 for molten glass 2 provided with a layer of insulating bricks 3. However in this construction heat loss is reduced from the refractory trough sides and base by means of two outer layers 20 of very highly insulated material e.g. Microtherm. Arranged along the edge of a refractory trough are a series of burner blocks 13.

The forehearth roof is comprised of a bubble alumina block 21 which spans over the trough and is provided with outer layers 22 of high insulating ceramic fibre material. In the section shown the bubble alumina block is shaped so as to provide, a central duct 23 for the venting of exhaust gases from the burners of blocks 13. It should however be appreciated that not every bubble alumina block of this conditioning section need be shaped as block 21 since the number of venting ducts required in each section having the construction of FIG. 2 will be chosen simply as regards to the amount of venting required. The venting duct 23 is provided with a damper block 12 for control of air flow in conventional manner. The highly insulated construction of FIG. 2 will hereinafter be referred to as "Grade A Insulation".

Figure 3:
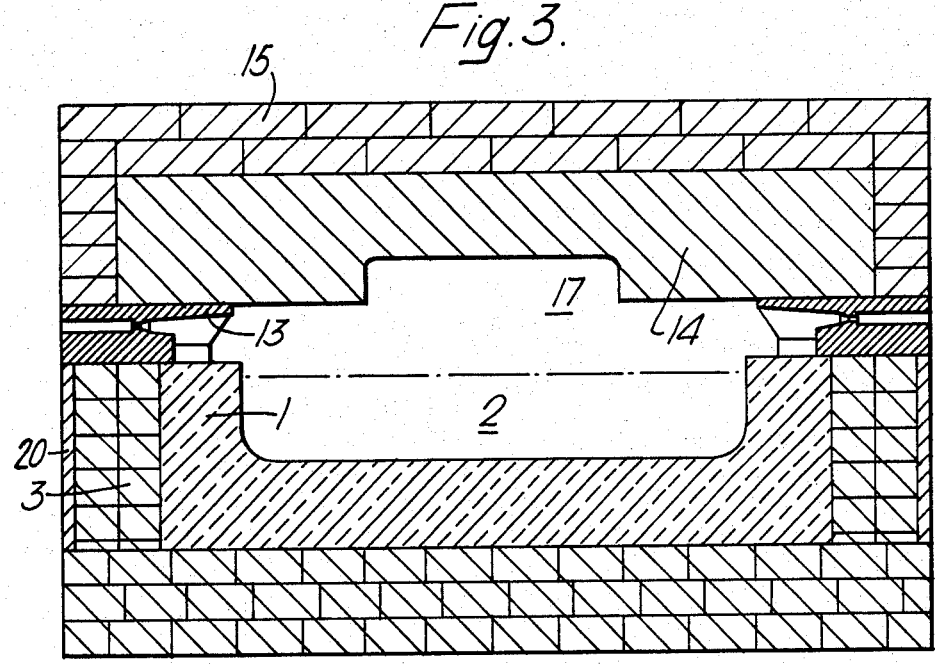
FIG. 3 is a cross-section through a cooling zone section of a forehearth according to the present invention.

FIG. 3 illustrates a forehearth section of less highly insulating characteristics than that of FIG. 2 though of more highly insulating characteristics than that of the right-hand side of FIG. 1. Thus the forehearth section shown in FIG. 3 comprises a refractory trough 1 for molten glass 2 provided with a layer of insulating bricks 3. In the embodiment of FIG. 3 however to reduce side heat losses there is provided along the side walls of the trough an outer layer 20 of the highly insulating Microtherm material. As before along the edge of the forehearth there are arranged a series of burner blocks 13. The forehearth roof comprises a block of bubble alumina 14 having a central channel 17 and supporting a double layer of refractory bricks 15. Hereinafter the insulating characteristics of FIG. 3 will be referred to as "Grade B Insulation".

Figure 4:
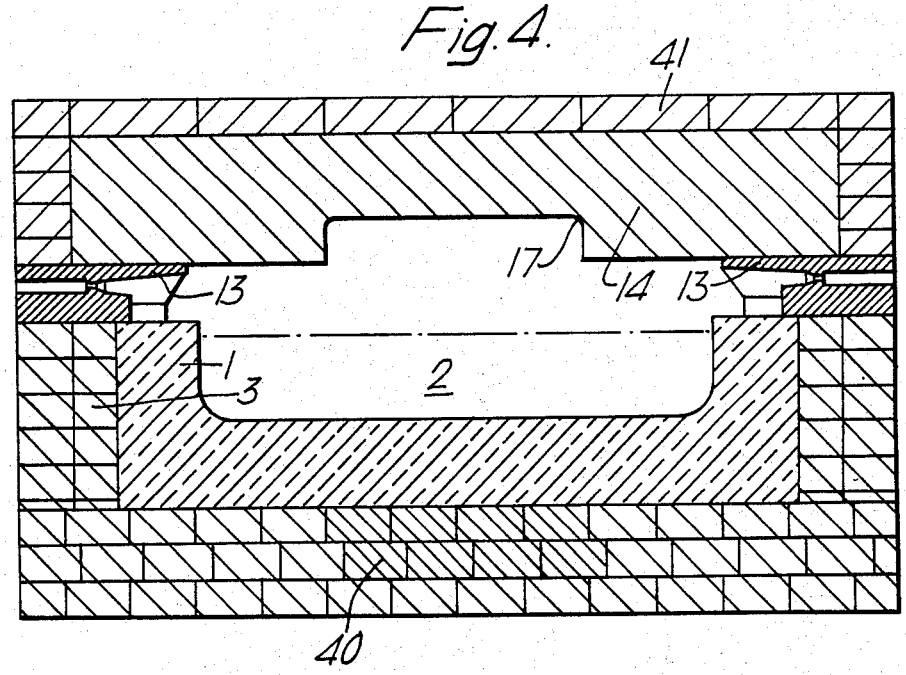
FIG. 4 is a cross-section through another embodiment of cooling zone section according to the present invention.

FIG. 4 shows a forehearth section construction for use where high bottom temperatures are a problem. This forehearth section is of similar construction to that shown on the right-hand side of FIG. 1 comprising the refractory trough 1 for molten glass 2 and layer of insulating bricks 3. Again along the side of the trough is arranged an array of burner blocks 13 and the forehearth roof comprises a prefabricated bubble alumina block 14 with central channel 17. In this embodiment the roof comprises of single layer of insulating bricks 41. In the embodiment of FIG. 4 below the bottom of the molten glass stream some of the insulating bricks 3 are replaced by fire-bricks 40 which act as a heat sink for removal of heat from the bottom of the glass stream. The insulating characteristics of this section are referred to hereinafter as "Insulation Grade D".

Figure 5:
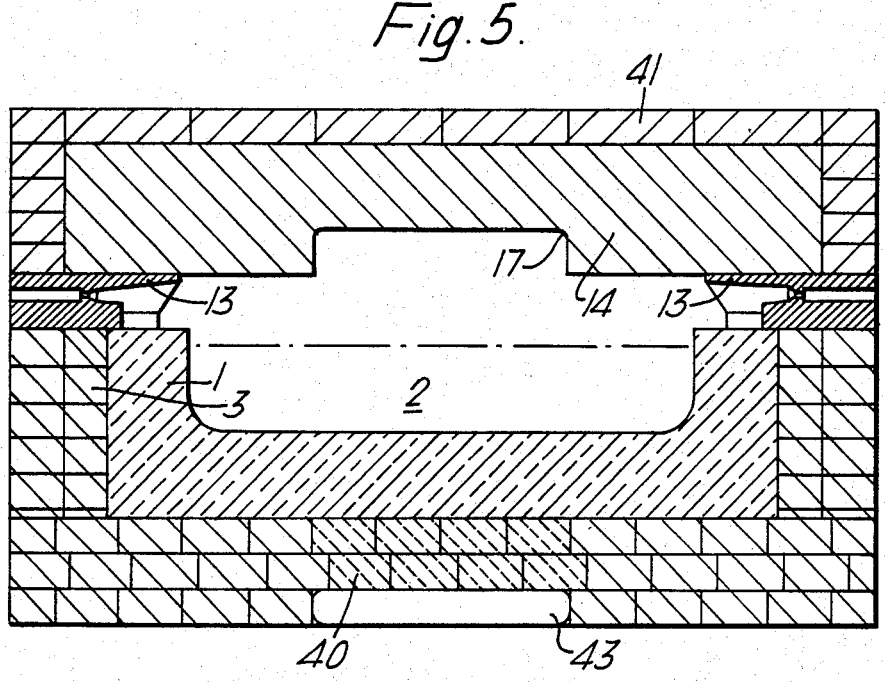
FIG. 5 is a cross-section through a further embodiment of cooling zone section according to the present invention.

FIG. 5 shows a forehearth section construction which, like that of FIG. 4, is for use where high bottom temperatures are a problem. Thus the forehearth section comprises a refractory trough 1 for molten glass 2 and a layer of insulating bricks 3, an array of burner blocks 13 and a roof comprising a prefabricated bubble alumina block 14 with central channel 17 and single layer of insulating bricks 41. In this embodiment, in addition to some of the insulating bricks 3 being replaced by fire-bricks 40 to act as a heat sink for removal of heat from the bottom of the glass stream, further to conduct away heat from the bottom of the glass stream, there is provided a longitudinal channel 43 for air. The insulating characteristics of this section are referred to hereinafter as "Insulation Grade E".

The heat losses of the different grades of insulation, relative to the conventional construction as illustrated on the left-hand side of FIG. 1, are as follows:

| Insulation Grade | Heat Loss |
| --- | --- |
| Conventional Construction | 1.0 |
| A | 0.5 |
| B | 0.8 |
| C | 0.9 |
| D | 1.1 |
| E | 1.5 |

Figure 6:
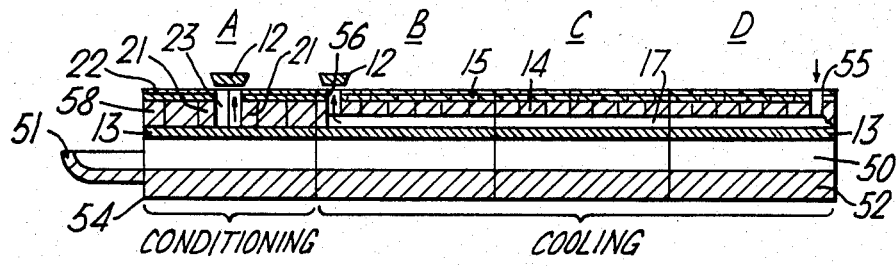
FIG. 6 is a longitudinal section through a forehearth according to the present invention employing sections of three different insulating characteristics.

FIG. 6 is a transverse section through a typical forehearth according to the present invention comprising sections having A, B and C insulation characteristics. It should however be appreciated that in any particular installation the number and order of sections is chosen according to the specific requirements. Thus for example in the case of glasses with high bottom temperatures a section having Grade D or E insulation characterists may be included in addition to those shown in FIG. 6 or in replacement of one of the sections indicated therein.

The furnace end of the forehearth of FIG. 6 is at the right-hand side of the drawing indicated 50 with the glass flow along the forehearth thus being from right to left in the direction of the arrow to a refractory spout 51 at the left-hand end. The forehearth comprises a cooling zone which has two sections of Grade C insulation and a Grade B section and a conditioning zone just before discharge into the spout 51 of Grade A insulation.

The bases of the sections of the forehearth have the structures indicated in the previous drawings with the trough and insulating brick layer being indicated generally as 52. In addition in the conditioning zone of Grade A insulation there is shown the bottom layer of highly insulating Microtherm material 54. Further in the section of Grade A insulation of course the side walls of the refractory trough are provided with two layers of insulating material as shown in FIG. 2. Also in the adjacent section of Grade B insulation there is side wall insulation as shown in FIG. 3 of the accompanying drawings.

Along the top of the entire trough formed by the sections is an array of the burner blocks 13.

The roof of the forehearth shown in FIG. 6 is made up of prefabricated bubble alumina blocks which span across the forehearth and are arranged adjacent to each other. In the zones of Grades B and C insulation these blocks 14 are shaped such as to provide a longitudinal channel 17 above the molten glass surface and the blocks 14 support layers 15 of insulating bricks thereover. In addition specially shaped blocks are provided such as to provide towards the furnace end of the forehearth an inlet 55 for the introduction of cooling air into the central channel 17 and an outlet 56 for venting of this cooling air and exhaust gases from the spout end of the cooling zone. A damper 12 is provided above the outlet duct 56 to control the air flow. In the embodiment illustrated a single air inlet is provided at the furnace end of the cooling section and a single outlet at the spout end of the cooling section. However if desired further inlets and outlets may be provided intermediate of these two.

In the conditioning section the prefabricated blocks are basically of two types. Simple rectangular blocks 58 which span across the forehearth trough and blocks 21 as illustrated in FIG. 2 which blocks 21 are adjacent each other to provide therebetween an outlet duct 23 for venting exhaust gases from the burners in this conditioning zone from the installation, the rate of venting being controlled by means of the damper 12 on the outlet of duct 23. Also, as shown in FIG. 2, in this conditioning section there are provided over the bubble alumina preformed blocks two layers of highly insulating ceramic fibre material.

In the production of glass articles, molten glass is discharged from a furnace (not shown) into a forehearth having for example the construction shown in FIG. 6. From the furnace end indicated generally at 50, the molten glass flows first through the two sections of Grade C insulation where there is desired loss of heat from the glass. Here heat is lost through the trough walls. In addition air introduced into the forehearth down duct 55 passes longitudinally over the forehearth roof along channel 17 and thus the central part of the molten glass stream loses heat by radiation. In addition heat may be supplied to the system as required by means of the burners in the side burner blocks 13 to ensure temperature homogeneity across the glass stream.

From the second section of Grade C insulation the molten glass stream passes into the zone of Grade B insulation which is still in the cooling zone of the forehearth. Here temperature loss from the sides of the glass trough is reduced by means of the side wall insulation 30 (see FIG. 3). Thus here the heat extracted from the system is less than in the two previous sections. The surface of the glass stream is cooled by radiation to the forehearth roof which is cooled by the longitudinal air stream which passes along a central channel in this section continuous with that in the previous section. Again heating may be supplied to the system as required by means of the burners of the burner blocks 13 arranged along the sides of the forehearth. The cooling gases and the exhaust gases from the burners are vented from the system through the duct 56. The rate of gas flow through the three sections of the cooling zone are controlled by means of the damper 12 provided above the outlet of this duct 56.

From the cooling zone the molten glass passes into the conditioning zone which is made up of a section of Grade A insulation material. In this zone there is a net heat input into the system or at the very most a very small heat loss. Thus in the trough region the heat loss is minimized by means of the outer layers of Microtherm material along the sides and bottom of the refractory trough. In addition the refractory roof is provided with a coating of highly insulating ceramic fibre material 22. As desired, heat may be introduced into the system by means of the burners of burner blocks 13; the exhaust gases from these burners being exhausted from the system through duct 23 the flow being controlled by means of damper 12.

By appropriate choice of the structure of the forehearth to have the correct insulating characteristics and by careful control of the heat put into the system by means of the burners of burner blocks 13 the glass discharged from the forehearth into the spout 51 for onward processing is at the required working temperature and of homogeneuous temperature (and therefore also viscosity) characteristics for a very much reduced input of heat compared to conventional forehearths which have the same insulating characteristics along their entire length. In this way the energy costs associated with the glass production can be minimized.

We claim:

1. A forehearth for use in glass production, which forehearth comprises:
   a refractory trough for molten glass comprising longitudinally disposed along it a cooling section and a conditioning section and having an insulating roof thereover;
   means for heating glass in the trough; and
   means in said cooling section for blowing cooling air longitudinally with respect to the direction of glass flow within the forehearth across the inside forehearth roof surface to cool the glass surface by heat exchange radiation; the cooling section comprising at least two longitudinally disposed zones which have different degrees of insulation from each other.

2. A forehearth according to claim 1 wherein a respective said cooling section zone is clad over the base and side walls with an outer layer of very highly insulating material.

3. A forehearth according to claim 1 wherein a respective said cooling section zone has highly insulating material provided along only the side walls of the refractory trough.

4. A forehearth according to claim 1 wherein a respective said cooling section zone is provided with a heat sink of fire-bricks below the refractory trough in order to draw away heat.

5. A forehearth according to claim 1 wherein a respective said cooling section zone is provided under the trough with a channel down which cooling air in the case of high bottom energy temperatures may be blown.

6. A forehearth according to claim 1 wherein: said forehearth roof is made up of prefabricated block members of refractory material lying side by side and each of which members spans across the trough, different insulation being provided over these prefabricated block members to provide said different degrees of insulation with said cooling section zones of the forehearth.

* * * * *